US009058490B1

(12) United States Patent
Barker et al.

(10) Patent No.: US 9,058,490 B1
(45) Date of Patent: Jun. 16, 2015

(54) SYSTEMS AND METHODS FOR PROVIDING A SECURE UNIFORM RESOURCE LOCATOR (URL) SHORTENING SERVICE (75) Inventors: Clifton Barker, Austin, TX (US); Chandrasekhar Cidambi, Fremont, CA (US); Tuan-Khanh Tran, Santa Ana, CA (US); Ameet Zaveri, Pleasanton, CA (US)

(73) Assignee: Symantec Corporation, Mountain View, CA (US)

( * ) Notice: Subject to any disclaimer, the term of this patent is extended or adjusted under 35 U.S.C. 154(b) by 243 days.

(21) Appl. No.: 13/025,728

(22) Filed: Feb. 11, 2011

(51) Int. Cl.
*G06F 15/16* (2006.01)
*G06F 21/56* (2013.01)
*H04L 29/06* (2006.01)

(52) U.S. Cl.
CPC ........... *G06F 21/564* (2013.01); *H04L 63/1416* (2013.01)

(58) Field of Classification Search
CPC .................... H04L 67/02; G06F 13/30887
USPC .......... 715/205, 738; 709/200, 220, 246, 245, 709/205, 738
See application file for complete search history.

(56) References Cited

U.S. PATENT DOCUMENTS

| | | | | |
|---|---|---|---|---|
| 7,136,932 B1 * | 11/2006 | Schneider | ...................... | 709/245 |
| 7,194,552 B1 * | 3/2007 | Schneider | ...................... | 709/245 |
| 7,565,402 B2 * | 7/2009 | Schneider | ...................... | 709/203 |
| 7,801,970 B2 * | 9/2010 | Behl et al. | ...................... | 709/217 |
| 7,971,245 B2 * | 6/2011 | Lalonde et al. | .................. | 726/22 |
| 8,224,994 B1 * | 7/2012 | Schneider | ...................... | 709/245 |
| 8,381,276 B2 * | 2/2013 | Costinsky | .......................... | 726/6 |
| 8,386,915 B2 * | 2/2013 | Howes et al. | ................. | 715/205 |
| 2003/0018694 A1 * | 1/2003 | Chen et al. | ..................... | 709/200 |
| 2007/0198741 A1 * | 8/2007 | Duffy et al. | ................... | 709/245 |
| 2007/0240220 A1 * | 10/2007 | Tuvell et al. | .................... | 726/24 |
| 2008/0275864 A1 * | 11/2008 | Kim et al. | .......................... | 707/5 |
| 2011/0030058 A1 * | 2/2011 | Ben-Itzhak et al. | ............ | 726/24 |
| 2011/0197281 A1 * | 8/2011 | Alme et al. | ...................... | 726/24 |
| 2011/0289434 A1 * | 11/2011 | Kieft | .............................. | 715/760 |
| 2012/0023390 A1 * | 1/2012 | Howes et al. | ................. | 715/205 |
| 2012/0078782 A1 * | 3/2012 | Schoenberg et al. | ........... | 705/40 |
| 2012/0158626 A1 * | 6/2012 | Zhu et al. | ......................... | 706/13 |
| 2012/0311707 A1 * | 12/2012 | Provos et al. | ................... | 726/23 |
| 2013/0014020 A1 * | 1/2013 | Dixon et al. | .................. | 715/738 |
| 2013/0312081 A1 * | 11/2013 | Shim et al. | ...................... | 726/13 |

* cited by examiner

*Primary Examiner* — Kevin Bates
*Assistant Examiner* — Clarence D McCray
(74) *Attorney, Agent, or Firm* — Holland & Hart, LLP (57) ABSTRACT

A computer-implemented method to provide a secure uniform resource locator (URL) shortening service is described. A URL is received via a browser provided on a display of a computing device. A shortened URL is generated to represent the received URL. A determination is made as to whether a classification assigned to a web site associated with the shortened URL is valid. Upon determining that the assigned classification is not valid, the web site is evaluated in order to assign an updated valid classification to the web site.

16 Claims, 10 Drawing Sheets

SYSTEMS AND METHODS FOR PROVIDING A SECURE UNIFORM RESOURCE LOCATOR (URL) SHORTENING SERVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

As previously mentioned, computer networks may be used to communicate and share data between the various computers connected to the networks. In some instances, the shared data may be identified with a uniform resource locator (URL) that provides an address or location for the data. In one example, a user may be presented with a URL on a display of the computer. The user may view the URL and desire to access the data, file, program, etc. represented by the presented URL. In some cases, the URL may shortened to an abbreviated version of the original URL. In some instances, data associated with the URL may be malicious. As a result, when the user clicks on the URL (either the original or the shortened version), the computer may access malicious content. Accordingly, benefits may be realized by providing systems and methods for providing a secure URL shortening service.

SUMMARY

According to at least one embodiment, a computer-implemented method to provide a secure uniform resource locator (URL) shortening service is described. A URL is received via a browser provided on a display of a computing device. A shortened URL is generated to represent the received URL. A determination is made as to whether a classification assigned to a web site associated with the shortened URL is valid. Upon determining that the assigned classification is not valid, the web site is evaluated in order to assign an updated valid classification to the web site.

In one embodiment, a determination may be made as to whether the web site associated with the shortened URL has been previously classified. In addition, a determination may be made whether a refresh rate associated with the classification of the web site has expired. The classified web site may be accessed upon determining that the refresh rate has expired. A determination may be made as to whether changes have occurred to the web site. The web site associated with the shortened URL may be reclassified upon detecting changes to the web site.

In one configuration, access to the web site associated with the shortened URL may be prevented upon determining that the web site has been assigned a malicious classification. In one example, a request may be received to generate the shortened URL to represent the received URL. A notification may be provided that the web site associated with the received URL is malicious.

A computing device configured to provide a secure uniform resource locator (URL) shortening service is also described. The computing device may include a processor and memory in electronic communication with the processor. The computing device may also include a URL shortening service module configured to receive a URL via a browser provided on a display of the computing device, and generate a shortened URL to represent the received URL. The module may be further configured to determine whether a classification assigned to a web site associated with the shortened URL is valid, and upon determining that the assigned classification is not valid, the module may be configured to evaluate the web site in order to assign an updated valid classification to the web site.

A computer-program product for providing a secure uniform resource locator (URL) shortening service is also described. The computer-program product may include a non-transitory computer-readable medium having instructions thereon. The instructions may include code programmed to receive a URL via a browser provided on a display of the computing device, and code programmed to generate a shortened URL to represent the received URL. The instructions may further include code programmed to determine whether a classification assigned to a web site associated with the shortened URL is valid, and upon determining that the assigned classification is not valid, the instructions may include code programmed to evaluate the web site in order to assign an updated valid classification to the web site.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing, a uniform resource locator (URL) is a uniform resource identifier (URI) that may specify where an identified resource is available and the mechanism for retrieving the resource. An example of the user of URLs is for the addresses of web pages on the World Wide Web. A URL may include some of the following: a scheme name (e.g., protocol), followed by a colon, then, depending on the scheme, a domain name (e.g., Internet Protocol (IP) address), a port number, and a path of the resource to be fetched of the program to be run. In some instances, the syntax of a URL may be difficult for a user to remember because of the length of the URL or for other reasons. URL shortening is a technique on the World Wide Web in which a URL may be made substantially shorter in length. This may involve using hypertext transfer protocol (HTTP) redirect on a domain name that is short to link to a web page which has a long URL.

Existing URL shortening services, however, suffer from several drawbacks. For example, existing services may obfuscate URLs with limited or no protection against malware. When a URL is shortened, a user may not know where that shortened link redirects to and what the actual web page content includes. URLs linked to websites hosting malicious content may be shortened and presented to users as an obfuscated URL. If a user were to inadvertently click on a shortened link, the user could easily be redirected to malicious or phishing content hosted on a remote website.

As another example, some existing services may provide blacklist detection of specific URLs or domain sites to prevent users from accessing malicious short URLs. This may easily be circumvented through the use of redirection. A benign URL which redirects to a malicious website may be shortened without detection. When a user accesses the benign shortened URL, the user may immediately be redirected to malicious content on a website.

Further, the Internet topography is in a constant state of change with malware. Malicious content may be removed or added to websites at a moment's notice. As a result, a frequent detection rate for classifying such websites as being malicious or benign may be required in order to prevent false negatives or false positives. This may require a shortening service that constantly updates classification ratings of both existing (previously) rated shortened URLs and new, unknown shortened URLs.

In addition, some shortening services rely on violation reports from users. Unfortunately, these require human intervention to submit the reports. The URL shortening service of the present systems and methods may be autonomous and may automatically submit unknown (or unclassified) URLs for analysis. As a result, there may be no bottleneck for processing and determining a URL's potential rating.

In one embodiment, the present systems and methods provide a secure, shortened version of a URL with the appropriate translations back to the original URL and redirection. The present systems and methods may provide a quick, efficient URL shortening while protecting users from inadvertently navigating to a malicious website when the shortened URL is translated and redirected.

Figure 1:
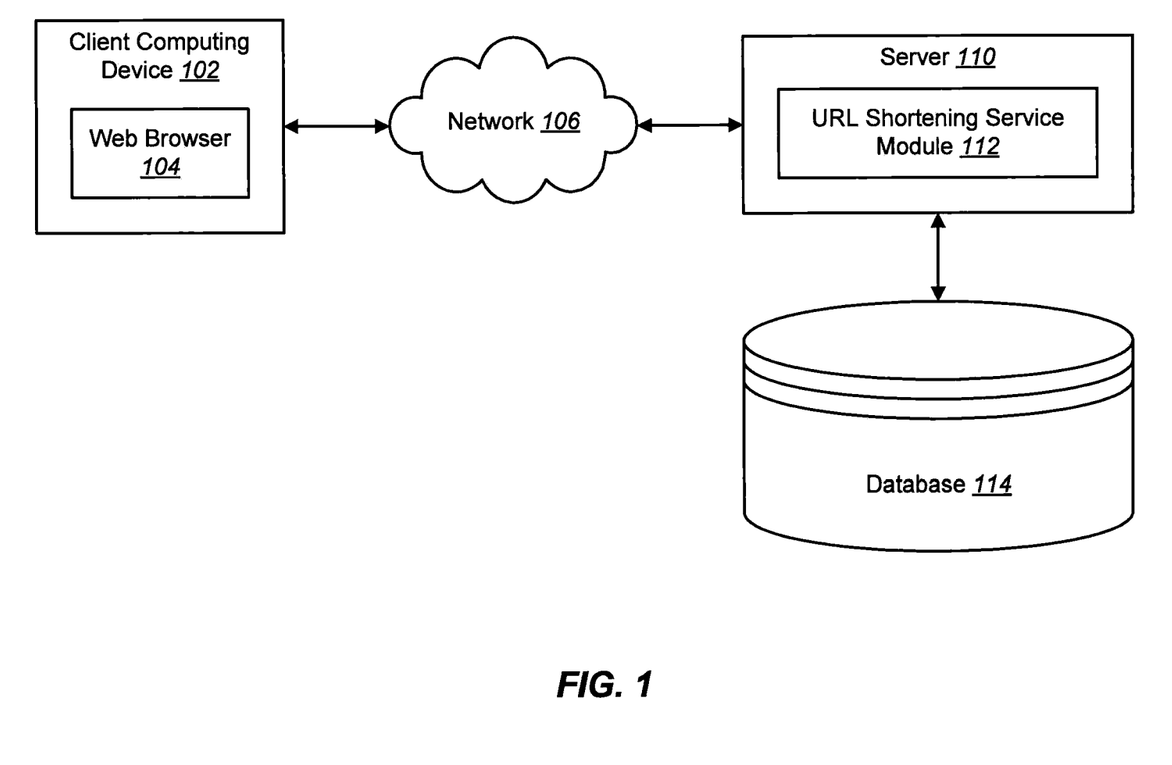
FIG. 1 is a block diagram illustrating one embodiment of an environment in which the present systems and methods may be implemented.

FIG. 1 is a block diagram illustrating one embodiment of an environment in which the present systems and methods may be implemented. In one configuration, a client computing device 102 may communicate with a server 110 across a network 106. The client computing device 102 may include, but is not limited to, a personal computer (PC), a laptop, a personal digital assistant (PDA), a smartphone, a mobile communications device, or any other type of computing device. The client computing device 102 may include a web browser 104. The browser 104 may provide an interface for a user of the client computing device 102 to access websites available over the World Wide Web. The browser 104 may retrieve a website associated with a particular URL.

In one example, the server 110 may include a URL shortening service module 112. The module 112 may generate a shortened version of an original URL associated with a website. The shortened URL and the original URL may be stored in a database 114 for subsequent retrieval by the server 110. In addition, the URL shortening service module 112 may further provide a real-time classification of a website associated with a shortened URL. The classification may indicate whether the website includes malicious content, such as malware. Details regarding the classification of a website associated with a shortened URL will be explained below.

Figure 2:
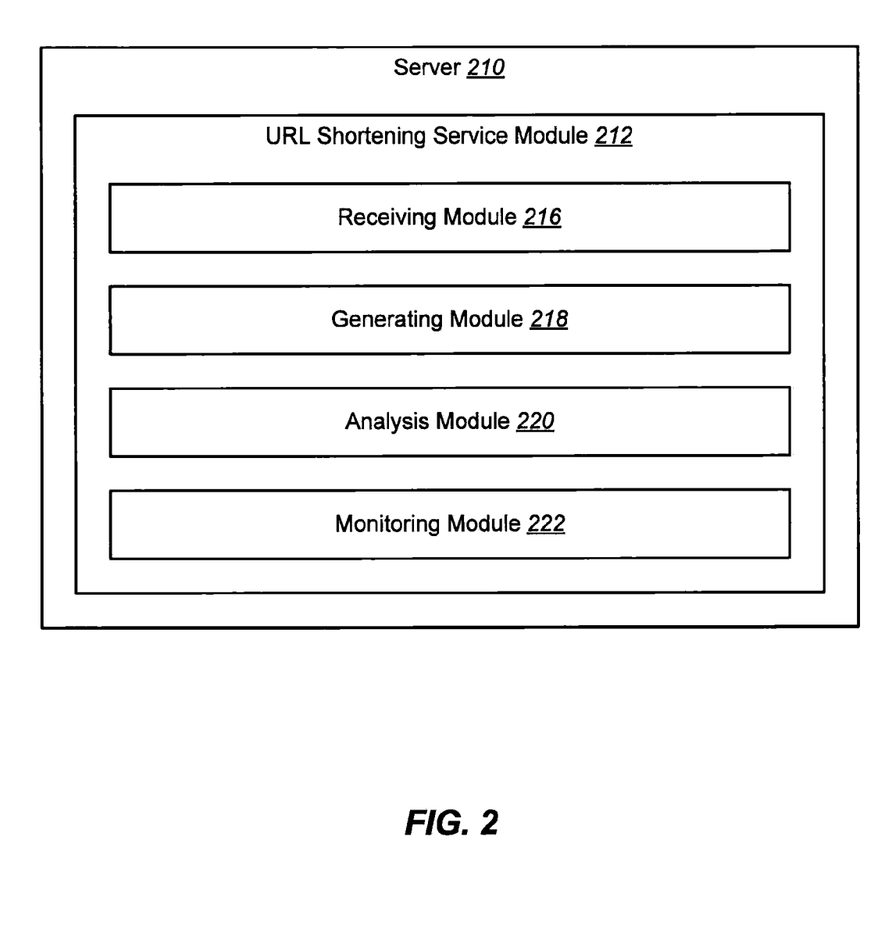
FIG. 2 is a block diagram illustrating one embodiment of a server in accordance with the present systems and methods.

FIG. 2 is a block diagram illustrating one embodiment of a server 210 in accordance with the present systems and methods. In one configuration, the server 210 may include a URL shortening service module 212. As previously described, the module 212 may generate a shortened version of an original URL associated with a website. A user may access the website by clicking or typing the shortened version of the URL in the web browser 104. The shortened version of the URL may then be redirected to the original URL in order to access the associated website.

In one configuration, the module 212 may include a receiving module 216, a generating module 218, an analysis module 220, and a monitoring module 222. The receiving module 216 may receive an original URL. The generating module 218 may then generate a shortened version of the original URL that was received by the receiving module 216. In one embodiment, the receiving module 216 may include a data field. A user may enter the original URL into the data field. The generating module 218 may generate a shortened version of the original URL entered into the data field. A user may then enter or otherwise access the shortened version of the URL in a web browser 104 in order to access the associated web site.

In one example, the analysis module 220 may analyze and evaluate a web site associated with a shortened URL. The analysis module 220 may determine certain characteristics of the web site to classify the web site. The classification may indicate that the web site include malicious content, non-malicious content, etc. In one embodiment, if a web site is classified as including malicious content, a user may receive a notification after entering a shortened version of the URL that is associated with the web site. The notification may include a message to the user that the requested web site associated with the shortened URL has been classified as a malicious web site. The monitoring module 222 may continue, e.g., to monitor the web site for changes to the web site's content. If the content is changed (or if a pre-determined amount of time has passed), the analysis module 220 may reanalyze the web site, e.g., to determine whether the previous classification assigned to the web site is still valid. For example, the analysis module 220 may initially assign a web site a malicious classification because of the content included on the web site. The content, however, may be removed at a time subsequent to the analysis module 220 assigning the initial classification. As a result, the analysis module 220 may reanalyze the web site and may assign a different classification that indicates that the web site associated with a shortened URL is now a non-malicious web site.

Figure 3:
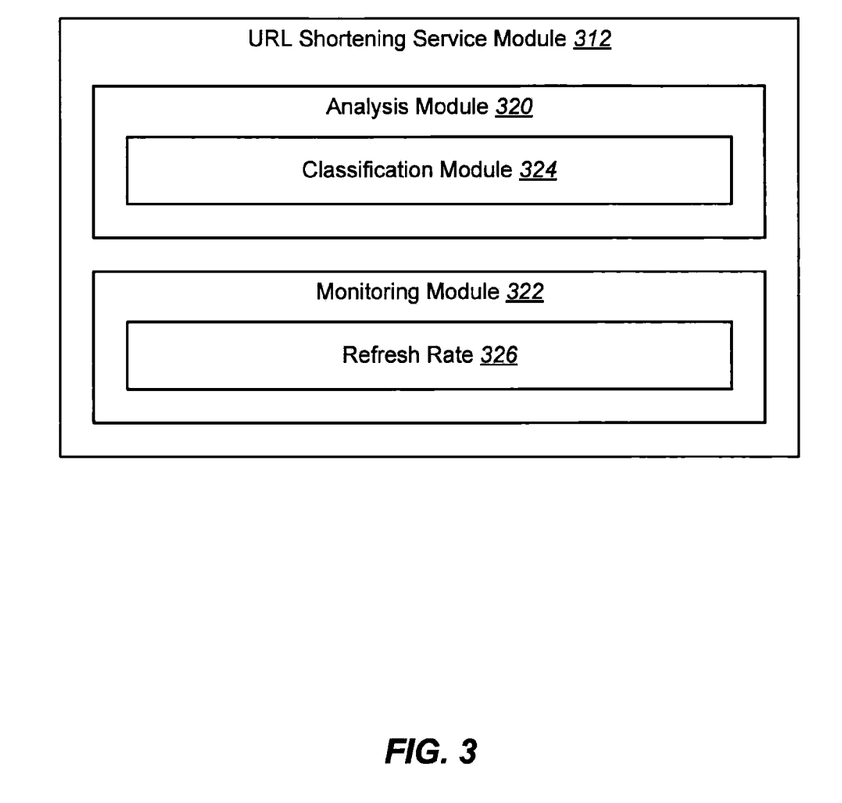
FIG. 3 is a block diagram illustrating a further embodiment of a URL shortening service module in accordance with the present systems and methods.

FIG. 3 is a block diagram illustrating a further embodiment of a URL shortening service module 312 in accordance with the present systems and methods. In one configuration, the module 312 may include analysis module 320 and a monitoring module 322, as previously described. The analysis module 320 may include a classification module 324. The classification module 324 may assign a classification to a web site associated with a shortened URL. The analysis module 320 may analyze the content of the web site to determine whether the web site include malicious or non-malicious content. Based on the results of the analysis of the web site, the classification module 324 may classify the web site as a malicious web site or a non-malicious web site. If a user attempts to access a web site that has been classified as a malicious web site using a shortened URL, the shortening service module 312 may provide a notification to the user that the web site is classified as a potentially malicious web site.

In one configuration, the monitoring module 322 may include refresh rate 326. The refresh rate 326 may be configurable and may indicate when a web site, previously classified by the classification module 324, is to be reanalyzed and (if needed) reclassified. For example, a user may submit an original URL associated with a web site. The URL shortening service module 312 may generate a shortened version of the original URL. The web site associated with the shortened URL may be initially analyzed and assigned a classification depending on the content and characteristics of the web site. The monitoring module 322 may continuously monitor the web site and when the refresh rate 326 expires, the analysis module 320 may reanalyze the web site. If the content or other characteristics of the web site have changed since the web site was assigned the initial classification, the classification module 324 may assign a different classification to the web site. The monitoring module 322 may continue to monitor the web site and when the refresh rate 326 expires again, the analysis module 320 may again analyze the web site and, if necessary, the classification module 324 may assign a different classification to the web site, depending on the analysis performed by the analysis module. As a result, real-time classification of web sites associated with shortened URLs may be performed.

Figure 4:
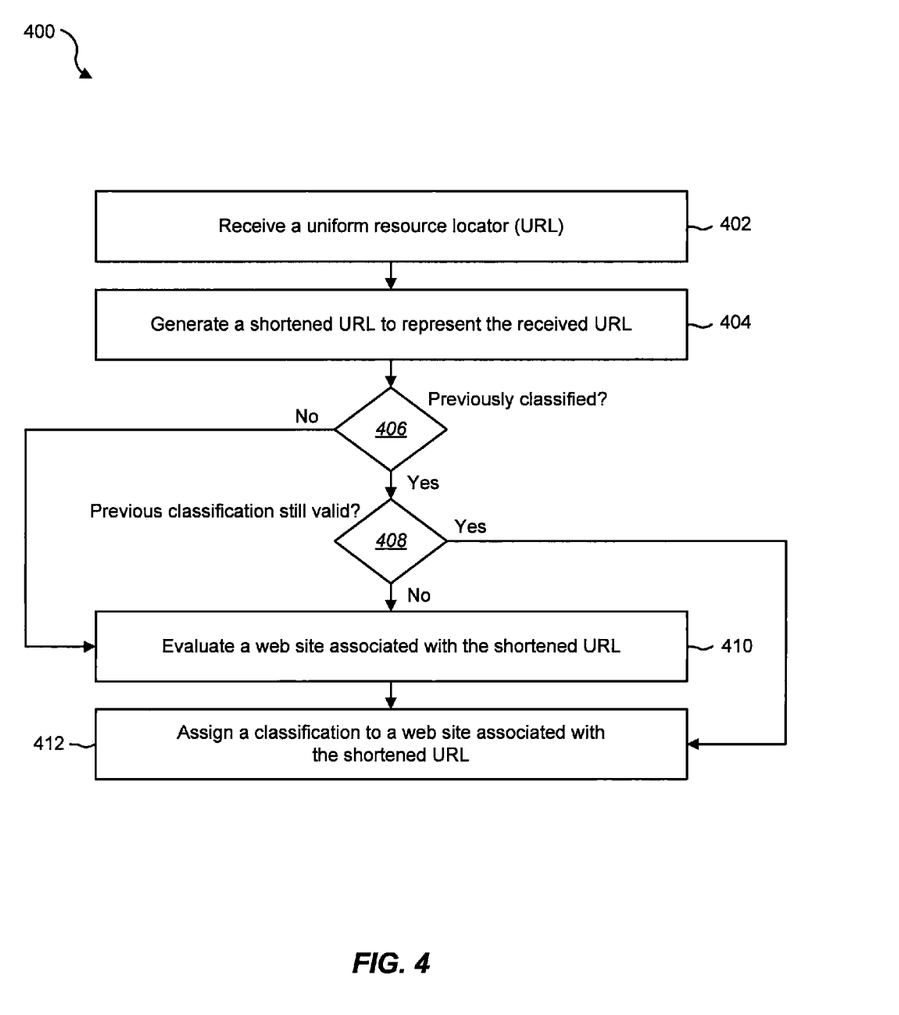
FIG. 4 is a flow diagram illustrating one embodiment of a method to provide a secure URL shortening service.

FIG. 4 is a flow diagram illustrating one embodiment of a method 400 to provide a secure URL shortening service. In one configuration, the method 400 may be implemented by the URL shortening service module 112.

In one example, a URL may be received 402. For example, a user may type or enter the URL in a data field. A shortened URL may be generated to represent the received URL. In other words, an abbreviated URL may be generated that may represent the longer received URL. In one configuration, a first determination 406 may be made as to whether a web site associated with the shortened URL (and the original received URL) has been previously classified. If it is determined 406 that the web site has not been previously classified, the web site associated with the shortened URL may be evaluated 410. A classification may then be assigned 412 to the web site based on the evaluation. If, however, it is determined 406 that the web site has been previously classified, a second determination 408 may be made as to whether the previous classification assigned to the web site is still valid. If the previous classification is still valid, the same classification may be assigned 412 to the web site associated with the shortened URL. If, however, it is determined 408 that the previous classification is not valid, the web site may be evaluated 410 and a new classification may be assigned 412 to the web site associated with the shortened URL.

Figure 5:
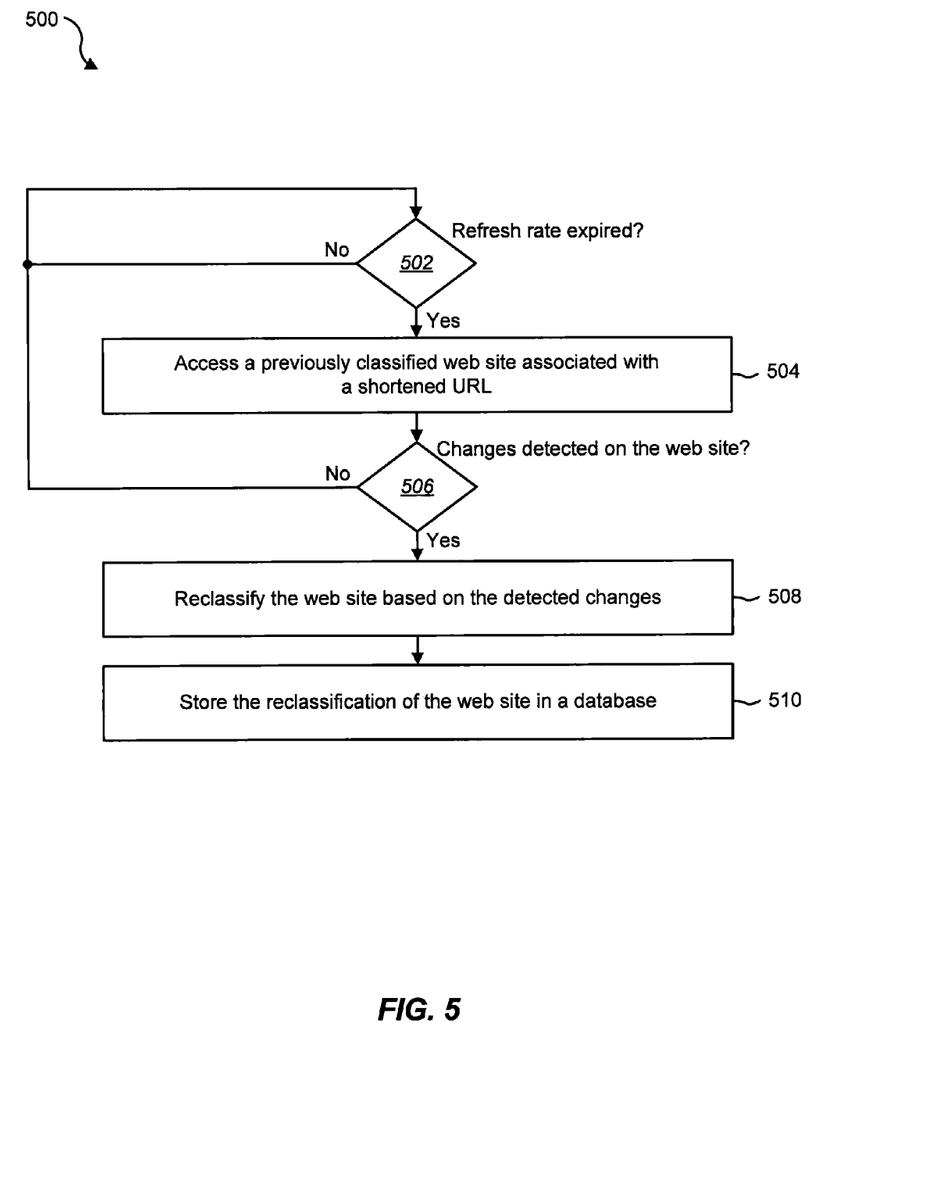
FIG. 5 is a flow diagram illustrating one embodiment of a method to analyze a classification previously assigned to a web site associated with a shortened URL.

FIG. 5 is a flow diagram illustrating one embodiment of a method 500 to analyze a classification previously assigned to a web site associated with a shortened URL. In one embodiment, the method 500 may be implemented by the URL shortening service module 112.

In one configuration, a determination 502 may be made as to whether a refresh rate has expired. If it is determined 502 that the refresh rate has not expired, the method 500 may continue to determine 502 whether the refresh rate has expired. If, however, it is determined 502 that the refresh rate has expired, a previously classified web site associated with a shortened URL may be accessed 504. A determination 506 may be made as to whether changes have been detected on the web site since the time the web site was previously classified. If it is determined 506 that no changes have been detected on the web site, the method 500 may return to determine 502 whether the refresh rate has expired. If, however, it is determined 506 that the refresh rate has expired, the web site may be reclassified 508 based on the detected changes. The reclassification of the web site associated with the shortened URL may be stored 510 in a database.

Figure 6:
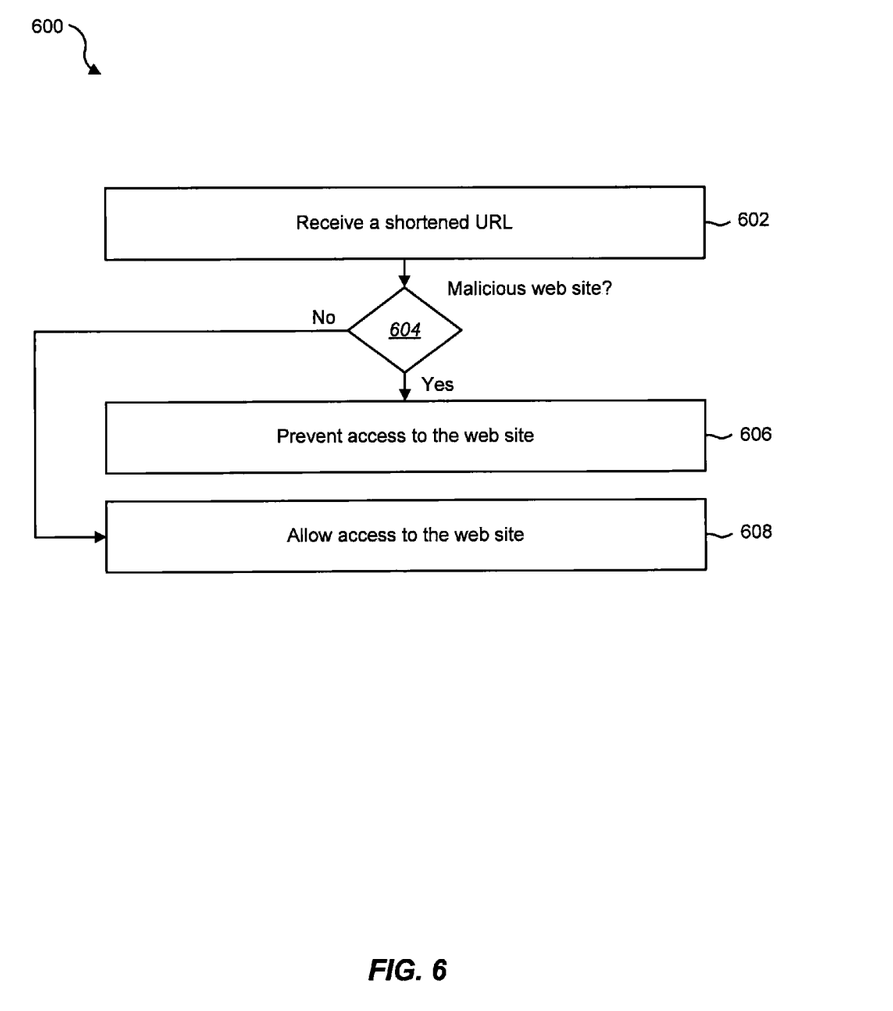
FIG. 6 is a flow diagram illustrating one embodiment of a method to regulate access to a web site associated with a shortened URL.

FIG. 6 is a flow diagram illustrating one embodiment of a method 600 to regulate access to a web site associated with a shortened URL. In one configuration, the method 600 may be implemented by the URL shortening service module 112.

In one example, a shortened URL may be received 602. The shortened URL may be received 602 by the URL shortening service module 112 via the web browser 104. The shortened URL may be associated with a web site. A determination 604 may be made as to whether the web site is a malicious web site. If it is determined 604 that the web site is a malicious web site, access to the web site may be prevented 606. For example, a warning message or other type of notification may be provided to a user indicating that the requested web site associated with the provided shortened URL is a malicious web site. If, however, it is determined 604 that the web site is not a malicious web site, access to the web site may be allowed 608. For example, the requested web site may be displayed to the user via the web browser 104.

Figure 7:
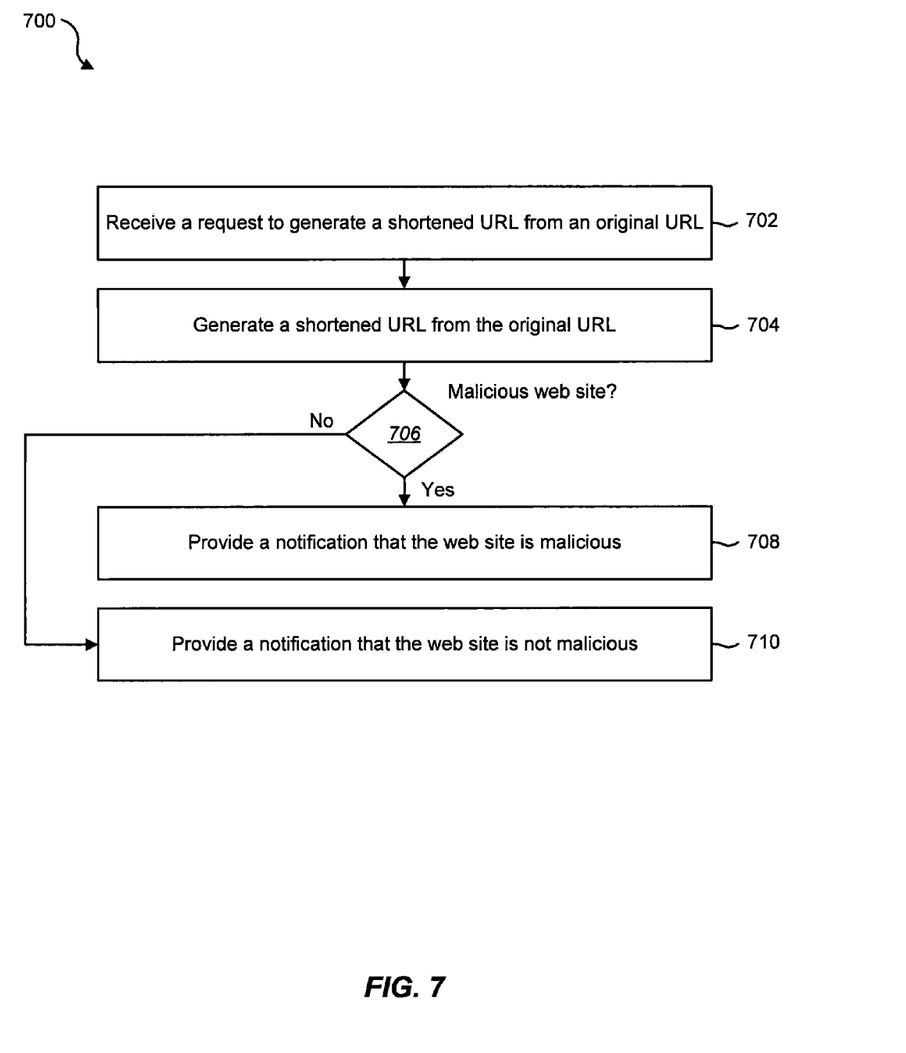
FIG. 7 is a flow diagram illustrating one embodiment of a method to provide a notification regarding the classification of a web site associated with a shortened URL.

FIG. 7 is a flow diagram illustrating one embodiment of a method 700 to provide a notification regarding the classification of a web site associated with a shortened URL. In one example, the method 700 may be implemented by the URL shortening service module 112.

In one configuration, a request to generate a shortened URL from an original URL may be received 702. A shortened URL may be generated 704 from the original URL. A determination 706 may be made as to whether a web site associated with the original URL (and the shortened URL) is a malicious web site. If it is determined 706 that the web site is malicious web site, a notification may be provided 708 indicating that the web site associated with the newly generated shortened URL is a malicious web site. If, however, it is determined 706 that the web site is not a malicious web site, a notification may be provided 710 indicating that the web site associated with the newly generated shortened URL is not a malicious web site.

Figure 8:
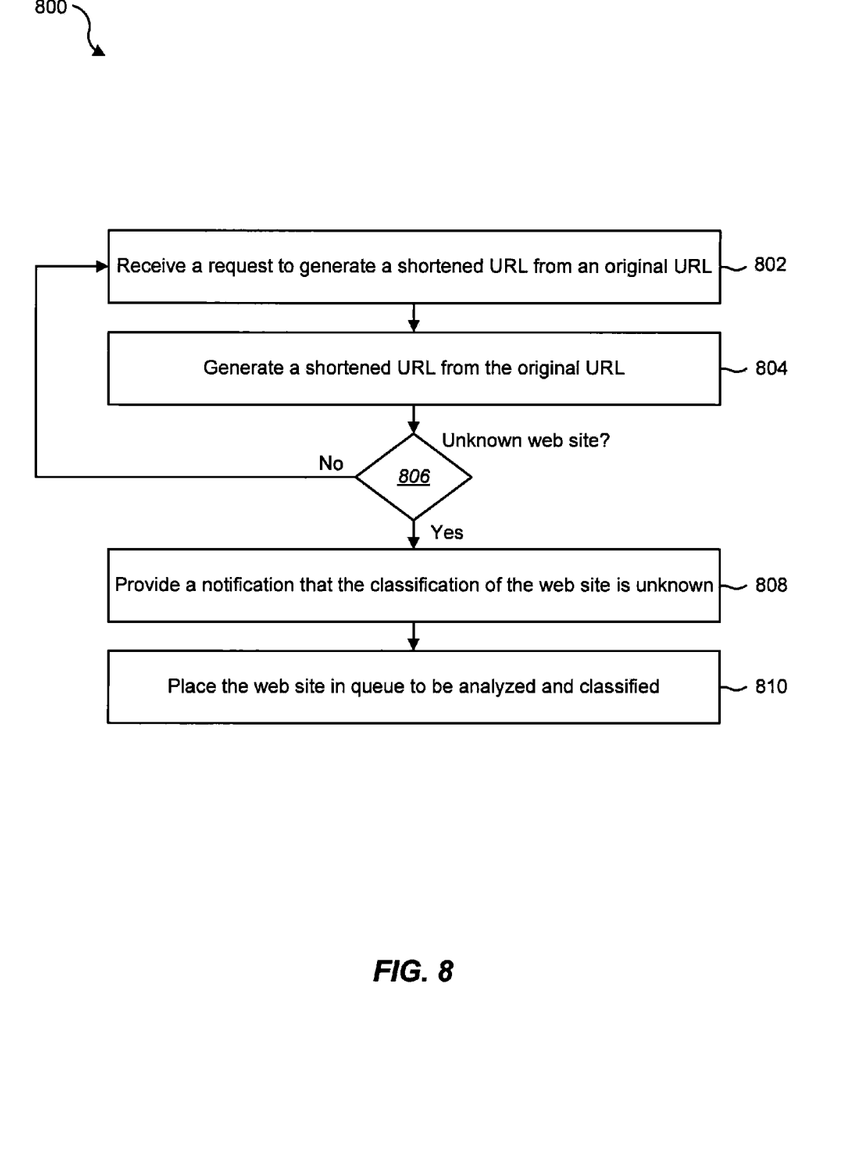
FIG. 8 is a flow diagram illustrating one embodiment of a method for providing a notification when a web site associated with a shortened URL is not classified.

FIG. 8 is a flow diagram illustrating one embodiment of a method 800 for providing a notification when a web site associated with a shortened URL is not classified. In one example, the method 800 may be implemented by the URL shortening service module 112.

In one configuration, a request to generate a shortened URL from an original URL may be received 802. A shortened URL may be generated 804 from the original URL. In one embodiment, a determination 806 may be made as to whether a web site associated with the original URL (and the shortened URL) is unknown. In other words, a determination 806 may be made as to whether the web site has been previously classified. If it is determined 806 that the web site is unknown (i.e., has not been previously classified), a notification may be provided 808 indicating that the classification of the web site associated with the newly generated shortened URL is unknown. The web site may be placed 810 in a queue to be analyzed and classified. If, however, it is determined 806 that the web site is known (i.e., has been previously classified), the method 800 may return to receive another request to generate a shortened URL from an original URL.

As previously described, there is currently no solution available for URL shortening that provides a reliable detection and protection against malware and phishing websites obfuscated behind shortened URLs. In one embodiment, the present systems and methods may prevent users from being exposed to obfuscated shortened URLs that may redirect the users to a web site that includes malicious content. As a result, users may safely utilize a URL shortening service without worrying about the content behind the shortened URL. The URL shortening service module 112 of the present systems and methods may provide close to real-time classification ratings of shortened URLs and their associated web sites while providing continual updates to these classifications. Additionally, as explained above, the present systems and methods may allow for the submission of unknown web sites (i.e., unclassified web sites) for analysis of malware.

In one configuration, when a long URL (i.e., an original URL) is submitted for shortening, the classification rating for the web site associated with the long URL may be checked and constantly updated. If the affiliated web site were at one point malicious and then later benign the URL shortening service module 112 may refresh the previous rating in a timely manner (and vice versa). If the rating of the web site were unknown, the web site may be queued up for eventual analysis and classification. This may provide a frequent detection rate for classifying web sites and providing a high efficacy.

Due to the URL shortening service module's 112 dynamic nature of keeping ratings fresh, the ratings provided by the module 112 may not fall victim to static sources such as a blacklist of malicious URLs, which may become outdated or circumvented completely via redirection. This results in blacklist providing a poor efficacy.

In one configuration, the URL shortening service module 112 may be reachable over HTTP(s). There may be no extraneous network configurations or private secure networks to restrict user access. Any user with Internet access may utilize the module 112. The URL shortening service module 112 may authenticate users that attempt to use the services provided by the module 112. This may allow users to confidentially post and review shortened URLs from a trusted source.

The URL shortening service module 112 may also utilize the Internet security service by leveraging the existing server-side infrastructures provided in certain platforms, such as, but not limited to, the Shasta platform. In one embodiment, the Shasta platform may provide a scheduling of URLs for malware analysis while also serving up URL requests to determine the classification rating. The module 112 may also store additional phishing classifications for web sites in the database 114.

In one configuration, the URL shortening service module 112 may provide a web interface, hosted on a remote server, for shortening long (full) URLs and looking up (translating) short URLs for safe, secure redirection to the corresponding full URL. The module 112 may look up the shortened URLs that are stored in the database 114.

Further, the URL shortening service module 112 may provide a secondary web service application programmers interface (API). This may allow external third parties to utilize the URL shortening service module 112 within their own services and/or application software such as, but not limited to, Twitter®, Facebook®, or Blogger®. The API may be accessible over HTTP and may adhere to the Representation State Transfer (REST) architecture style.

Figure 9:
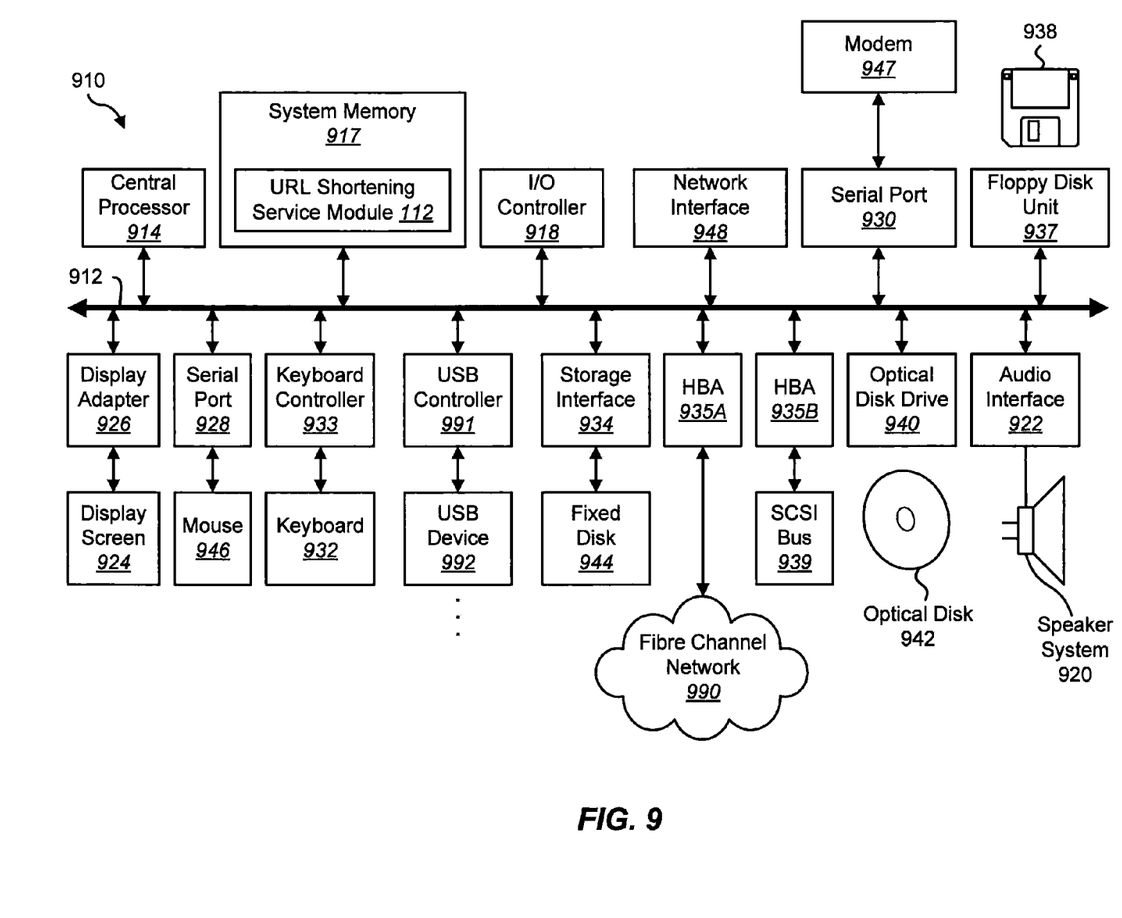
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 990), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the sequence recognizing module 104 to implement the present systems and methods may be stored within the system memory 917. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
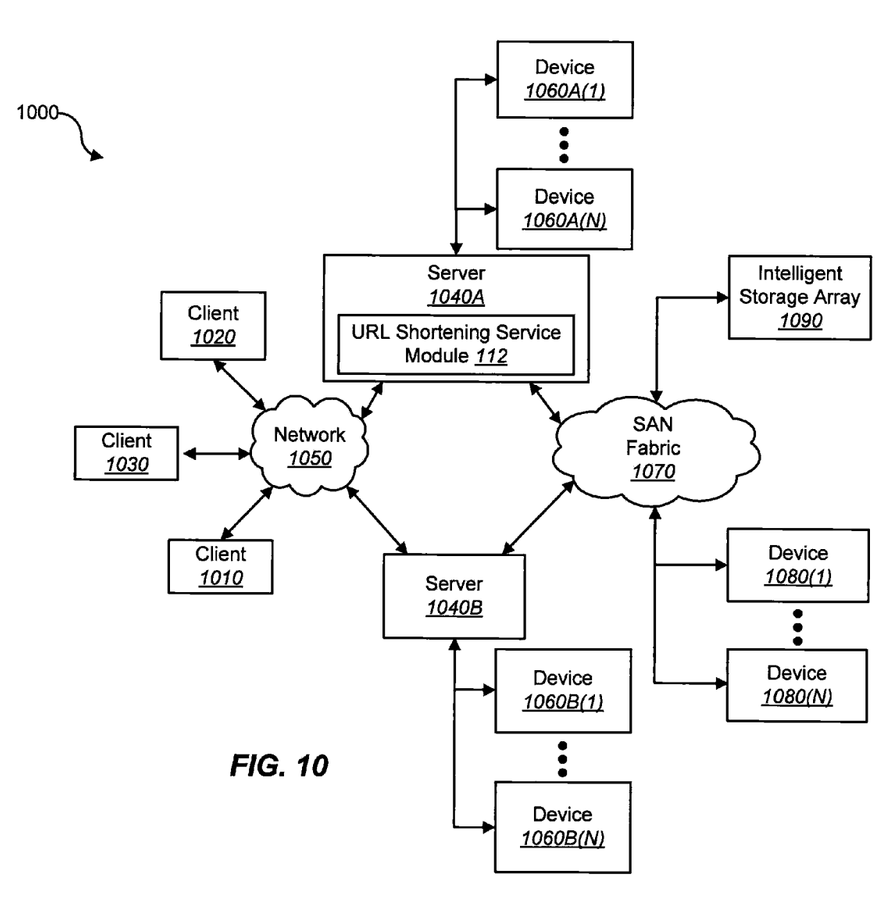
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the sequence recognizing module 104 may be located within a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to provide a secure uniform resource locator (URL) shortening service, comprising:

receiving a URL via a browser provided on a display of a computing device;

identifying a malicious element in a web site associated with the received URL;

generating, by a processor, a shortened URL to represent the received URL;

assigning a malware classification to the web site based on the identified malicious element, the malware classification being associated with the shortened URL;

configuring a refresh rate for the malware classification of the web site, wherein the refresh rate comprises an expiration of the malware classification of the web site;

determining whether the refresh rate associated with the malware classification of the web site has expired;

upon determining the refresh rate associated with the malware classification of the web site has expired, determining whether the malicious element is removed from the web site since the malware classification was assigned; and upon determining the malicious element is removed from the web site, assigning a new malware classification to the web site, wherein the web site is classified as non-malicious based on determining the malicious element is removed from the web site.

2. The method of claim 1, further comprising determining whether the web site associated with the shortened URL has been previously classified.

3. The method of claim 1, further comprising accessing the classified web site upon determining that the refresh rate has expired.

4. The method of claim 1, further comprising reclassifying the web site associated with the shortened URL upon detecting changes to the web site.

5. The method of claim 1, further comprising preventing access to the web site associated with the shortened URL upon determining that the web site has been assigned a malicious classification.

6. The method of claim 1, further comprising receiving a request to generate the shortened URL to represent the received URL.

7. The method of claim 6, further comprising providing a notification that the web site associated with the received URL is malicious.

8. A computing device configured to provide a secure uniform resource locator (URL) shortening service, comprising:
a processor;
memory in electronic communication with the processor;
instructions stored in the memory, the instructions being executable by the processor to:
receive a URL via a browser provided on a display of a computing device;
identify a malicious element in a web site associated with the received URL;
generate a shortened URL to represent the received URL;
assign a malware classification to the web site based on the identified malicious element, the malware classification being associated with the shortened URL;
configure a refresh rate for the malware classification of the web site, wherein the refresh rate comprises an expiration of the malware classification of the web site;
determine whether the refresh rate associated with the malware classification of the web site has expired; and
upon determining the refresh rate associated with the malware classification of the web site has expired, determine whether the malicious element is removed from the web site since the malware classification was assigned; and
upon determining the malicious element is removed from the web site, assigning a new malware classification to the web site, wherein the web site is classified as non-malicious based on determining the malicious element is removed from the web site.

9. The computing device of claim 8, wherein the instructions are executable by the processor to:
determine whether the web site associated with the shortened URL has been previously classified.

10. The computing device of claim 8, wherein the instructions are executable by the processor to:
access the classified web site upon determining that the refresh rate has expired.

11. The computing device of claim 10, wherein the instructions are executable by the processor to:
reclassify the web site associated with the shortened URL upon detecting changes to the web site.

12. The computing device of claim 8, wherein the instructions are executable by the processor to:
prevent access to the web site associated with the shortened URL upon determining that the web site has been assigned a malicious classification.

13. The computing device of claim 8, wherein the instructions are executable by the processor to:
receive a request to generate the shortened URL to represent the received URL.

14. The computing device of claim 13, wherein the instructions are executable by the processor to:
provide a notification that the web site associated with the received URL is malicious.

15. A computer-program product for providing a secure uniform resource locator (URL) shortening service, the computer-program product comprising a non-transitory computer-readable medium having instructions thereon, the instructions comprising:
receive a URL via a browser provided on a display of a computing device;
identify a malicious element in a web site associated with the received URL;
generate a shortened URL to represent the received URL;
assign a malware classification to the web site based on the identified malicious element, the malware classification being associated with the shortened URL;
configure a refresh rate for the malware classification of the web site, wherein the refresh rate comprises an expiration of the malware classification of the web site;
determine whether the refresh rate associated with the malware classification of the web site has expired;
upon determining the refresh rate associated with the malware classification of the web site has expired, determine whether the malicious element is removed from the web site since the malware classification was assigned; and
upon determining the malicious element is removed from the web site, assigning a new malware classification to the web site, wherein the web site is classified as non-malicious based on determining the malicious element is removed from the web site.

16. The computer-program product of claim 15, wherein the instructions are executable by the processor to:
determine whether the web site associated with the shortened URL has been previously classified.

* * * * *